United States Patent [19]
Árnason

[11] Patent Number: 5,992,792
[45] Date of Patent: Nov. 30, 1999

[54] AIRCRAFT WITH JET FLAP PROPULSION

[75] Inventor: Kristján Árnason, Reykjavik, Iceland

[73] Assignee: Verkfaedistofa Kristjans Armasonar, Iceland

[21] Appl. No.: 09/043,712

[22] PCT Filed: Sep. 29, 1995

[86] PCT No.: PCT/IB95/00818

§ 371 Date: Mar. 23, 1998

§ 102(e) Date: Mar. 23, 1998

[87] PCT Pub. No.: WO97/12804

PCT Pub. Date: Apr. 10, 1997

[51] Int. Cl.[6] .................................................. B64C 9/16
[52] U.S. Cl. ......................... 244/13; 244/207; 244/215; 244/216; 244/45 A
[58] Field of Search ............................ 244/13, 207, 208, 244/209, 213, 214, 215, 219, 216, 90 R, 45 A

[56] References Cited

U.S. PATENT DOCUMENTS

| | | | |
|---|---|---|---|
| 2,479,487 | 8/1949 | Goembel | 244/207 |
| 2,912,189 | 11/1959 | Pouit | 244/15 |
| 2,920,844 | 1/1960 | Marshall et al. | 244/207 |
| 2,961,192 | 11/1960 | Davidson | 244/15 |
| 2,978,207 | 4/1961 | Davidson | 244/42 |
| 3,056,566 | 10/1962 | Davidson | 244/15 |
| 3,100,094 | 8/1963 | Griswold, II | 244/207 |
| 3,127,129 | 3/1964 | Petrie | 244/207 |
| 3,362,659 | 1/1968 | Razak | 244/42 |
| 3,724,784 | 4/1973 | Von Ohain et al. | 244/207 |
| 3,774,864 | 11/1973 | Hurkamp | 244/207 |
| 3,887,147 | 6/1975 | Grieb | 244/207 |
| 4,610,410 | 9/1986 | Sibley | 244/207 |
| 4,615,499 | 10/1986 | Knowler | 244/207 |

Primary Examiner—Galen L. Barefoot
Attorney, Agent, or Firm—Jones & Askew

[57] ABSTRACT

In an aircraft (1) according to the invention the engine drives a blower and the compressed air is used to increase the lift of the wing (18) and the canard (22) using jet flap propulsion.

The airfoil profile has maximum thickness just forward of the control surface device (12) which has large included trailing edge angle and large leading edge radius. The control surface device hinge (17) is positioned close to the mean line (19) of the plane, and air slots (10) in the plane are blowing the control surface device.

9 Claims, 3 Drawing Sheets

AIRCRAFT WITH JET FLAP PROPULSION

BACKGROUND OF THE INVENTION

The invention relates to an aircraft with jet flap propulsion and as presented in the preamble of claim 1, i.e. an aircraft with an ordinary main plane or a further development hereof as presented in the preamble of claim 2: An aircraft, which in addition to the main plane has a foreplane, a so-called canard plane.

Aircraft with jet flap propulsion have been known for many years, for example from U.S. Pat. No. 2,912,189 or U.S. Pat. No. 2,961,192. Also jet flap propulsion aircraft with a foreplane have been known for years, for example from U.S. Pat. No. 3,362,659. Even aircraft where both the foreplane and the main plane use jet flap propulsion are known, cf. for example U.S. Pat. No. 3,056,566.

In the past several aircraft have been made with special and extensive flap and slot arrangements to reduce stall speed and needed runway. These aircraft are called STOL (short take-off and landing) aircraft. The operating costs of such aircraft are in most cases approximately 30% higher than on conventional aircraft. This lies in added maintenance costs, higher fuel consumption per distance flown. The added wing area (lower wing loading) creates added drag and reduced cruising speed.

Most of all earlier aircraft designers using the blown flap theory have concentrated their efforts on increasing the lift coefficient of the wings to reduce landing speed or to obtain added control force. Blown flaps give extra thrust and this causes problems when the aircraft is being slowed down for landing. In most of the previous patents using blown flaps only a small part of the engine power is used to avoid the problem of extra thrust. If all engine power is used on blown flaps it is necessary to be able to deflect the jet sheet through more than 90 degrees to obtain drag on landing. To be able to deflect air by coanda effect, the outside pressure must balance the centrifugal force of the jet sheet. This is only possible if the radius of the control flap is relatively large compared with the slot height. Furthermore, the duct pressure must be relatively low.

SUMMARY OF THE INVENTION

With an aircraft designed as presented and characterized herein, it is achieved that the jet flap principle is used to reduce the wing area of the aircraft and hereby to reduce the overall drag of the aircraft; consequently, the fuel consumpsion is reduced.

The aircraft is using conventional landing speed, but the reduced wing area makes cruising more economical.

For cruise performance of aircraft the lift/drag*mach number must be a maximum. A great part of the drag is created by the wing. The wing drag can be reduced if the aspect ratio (wing span/chord) is increased and also with boundary layer control. The aspect ratio is gradually going up as improvements in materials are made. But there is a drawback. Wing tip drag (induced drag):

$$C_{DI} = \frac{KC_L^2}{\pi A}$$

where

K=Constant depending on taper ratio and aspect ratio
$C_L$=Lift coefficient
A=Aspect ratio
$\pi$=3.1416 and minimum power is obtained when $C_{DI}$ is equal to 3* $C_{DO}$ where $C_{DO}$=airfoil profile drag $$C_L = \sqrt{\frac{\pi A}{K} 3 C_{DO}} \quad \text{for optimum cruise}$$

From this it is obvious that any improvements in stronger and lighter materials call for higher values of $C_L$. Aircraft flying today use less than the optimum value of $C_L$ for cruising. Typical value of $C_L$ used for cruise on present day aircraft is 0.2 to 0.5. Optimum value would be approx. 0.8 to 1.4 typically, so there is a substantial difference. If optimum $C_L$ could be used, smaller wings could be used with lower all up drag. In the past blown flaps have been used to increase lift for landing and taking off. Efforts have been concentrated on obtaining maximum $C_L$ and less on power used. In this invention blown flap, boundary layer control and propulsion are all combined, resulting in lower drag and better cruise performance, but still making large speed range possible. A typical wing section is thickened to the rear and a relatively short chord control surface is employed with an included trailing edge angle, which is up to two or three times that of a typical wing profile. The control surface has a large leading edge radius. This way a fairly large duct can be formed between the wing (or canard) beams to reduce pressure loss in the duct. The compressed air is blown through a slot over the upper surface of the flap, aileron and elevator. This way the boundary layer is energized and laminar flow is secured over the profile surface. The relatively short control surface chord will ensure low surface friction drag on the control surfaces and make large control surface travel possible with a simple hinge arrangement. With such a large leading edge radius for the control surfaces, the flow can be reversed by coanda effect to get reverse thrust. The compressed air can also be utilized for pressurization and ventilation of the aircarft.

BRIEF DESCRIPTION OF THE DRAWINGS

The present invention will be more fully understood from the detailed description given hereinbelow and the accompanying drawings which are given by way of illustration only, and thus are not limitative of the present invention and wherein.

DETAILED DESCRIPTION OF PREFERRED EMBODIMENTS

Figure 1:
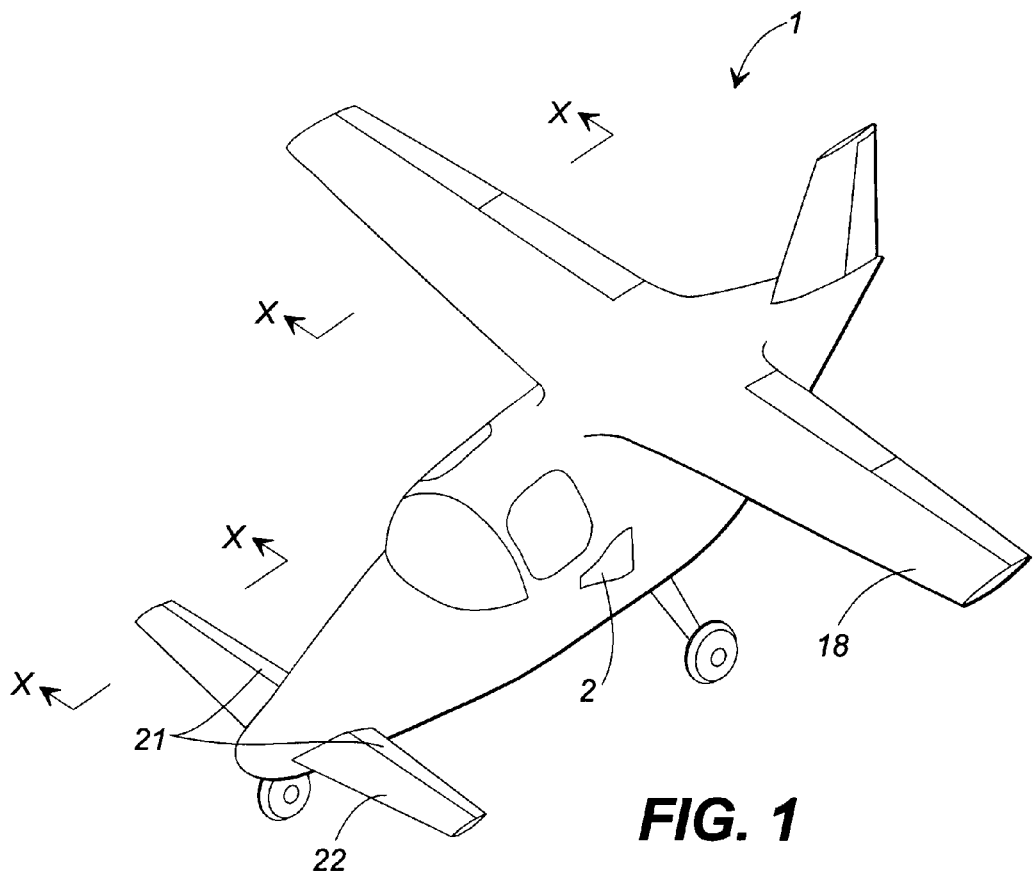
FIG. 1 shows an aircraft with foreplane and jet flap propulsion according to the invention.
Figure 2:
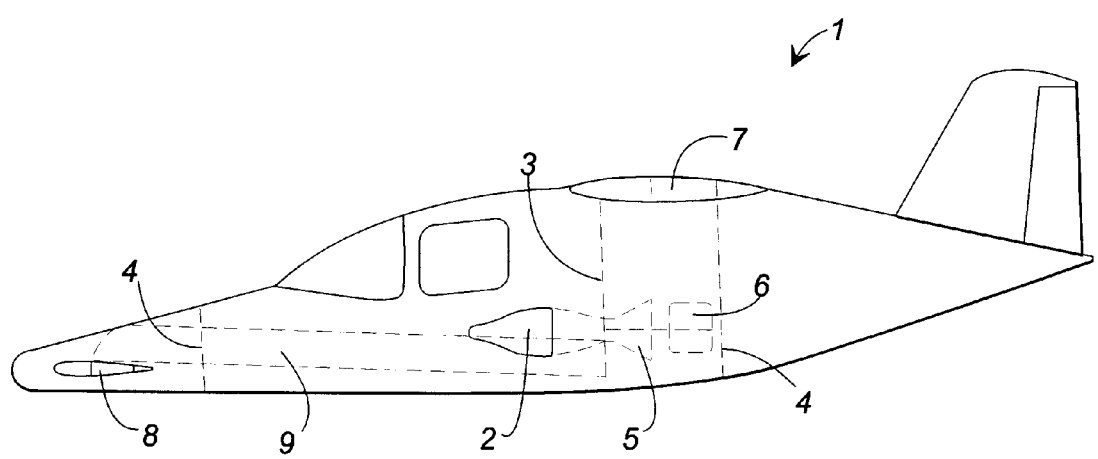
FIG. 2 shows a principal section to the fuselage of the aircraft in FIG. 1.
Figure 3A:
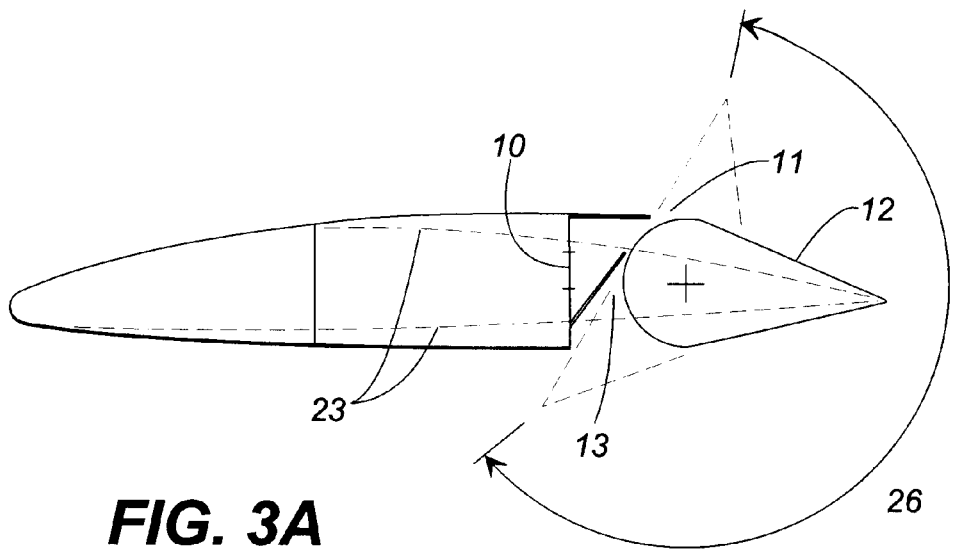
FIG. 3A shows a section X—X in FIG. 1 to the elevator part of the wing or the foreplane and it also illustrates a typical airfoil dotted for comparison.
Figure 3B:
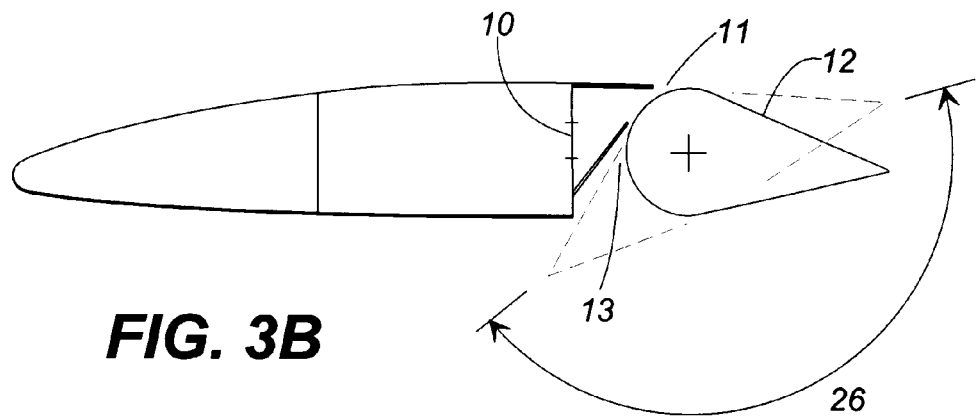
FIG. 3B shows a section X—X in FIG. 1 to the flap part of the wing or the foreplane.
Figure 3C:
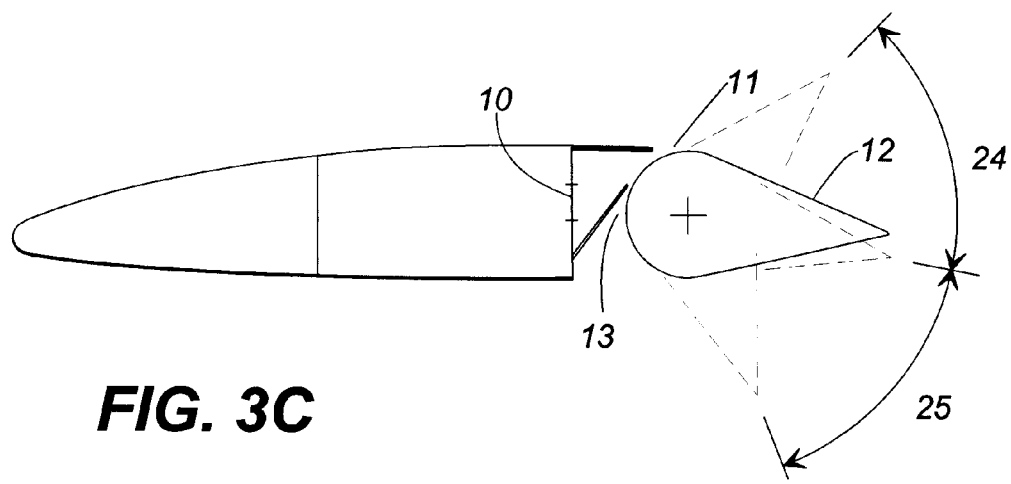
FIG. 3C shows a section X—X in FIG. 1 to the aileron part of the wing or the foreplane.
Figure 4:
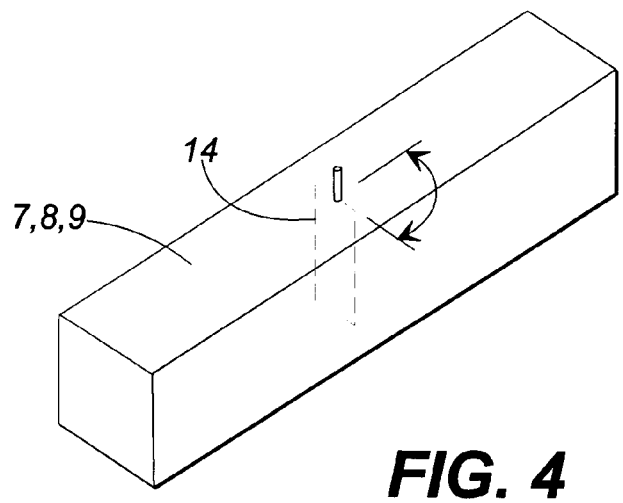
FIG. 4 shows in principle the air duct means with means for controlling the flow in the duct.
Figure 5A:
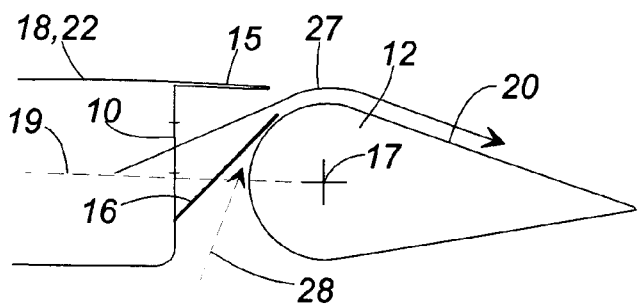
FIG. 5A shows a theoretical version of the section shown in FIG. 5C to illustrate possible airflows.
Figure 5B:
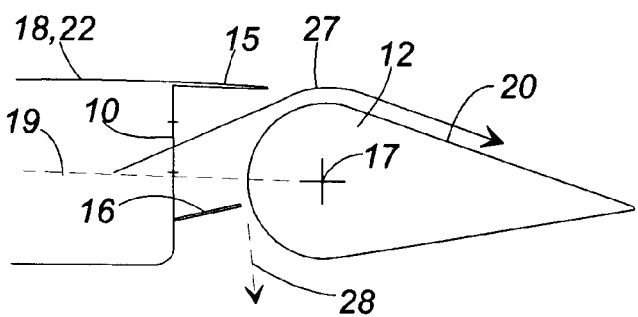
FIG. 5B shows another theoretical version of the section shown in FIG. 5C to illustrate possible airflows.
Figure 5C:
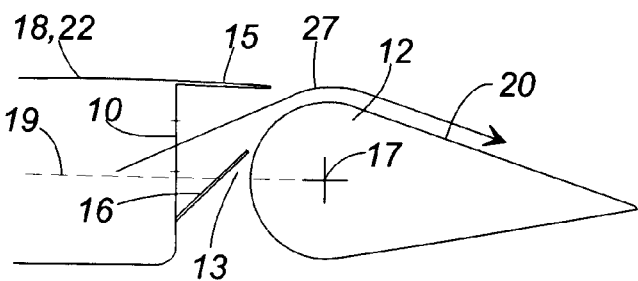
FIG. 5C shows in more detail a section to the control surface device and the air slot arrangement according to the invention.

A mass of air is blown from a slot in front of the control surfaces of the wing 18 and canard 22 to form the propulsive force for the aircraft 1. The general arrangement is shown in FIG. 1. When power is applied, the centre of the lift will move rearwards and therefore the canard 22 is used for longitudinal stability. Relatively, more airflow is diverted to the canard than to the wing to offset the rearward travel of the centre of the lift when power is applied, as more lift is thus ensured on the canard. FIG. 2 shows a section through the fuselage. Air intakes 2 are on each side of the fuselage with a duct through the pressure bulkhead 3 to a blower(s) 5, which may be any blower, centrifugal, axial or a bypass fan or bleed from a turbine engine compressor, driven by an engine(s) 6. The engine may be any power plant piston engine, any electrical or any future engine type. The compressed air goes to the spanwise duct 7 in the wing and the spanwise duct 8 in the canard via the duct 9 through the pressure bulkhead 4 in the fuselage. The airflow through the ducts 7, 8 or 9 can be adjusted with the control plate 14 as shown in FIG. 4. FIGS. 3A–C show sections through the wing or canard. The airflow goes through the holes 10 in the rear wing (or canard) beam web through the slot 11 and will follow the upper surface of the control surface 12 by coanda effect, even with the control surface in the full down (reverse) position. The plane 18 or canard 22 have profile as shown in FIG. 3A, with a typical airfoil 23 shown dotted for comparison. The control surface device 12, e.g. elevator, flaps or ailerons, is hinged with a hinge 17 just after the maximum thickness of the plane 18 or canard 22. The control surface device hinge 17 is positioned close to the mean line 19 of the plane 18 or the canard 22. The air slots or air holes 10 in the plane 18 or canard 22 for blowing the control surface device 12 are equipped with upper vanes or extensions 15 and lower vanes or sealing surfaces 16 for guiding the blown air to the top surface 20 of the device 12, which could be elevator, flaps or ailerons. A thin slot 13 in front of the control surface will ensure free travel of the surface. The position of the slot is optimized (see FIGS. 5 (A), (B) and (C)) for cruising, so that no flow or minor flow by ejector principle is secured as shown in FIG. 5C. The arrow 27 illustrates the main airflow and the arrow 28 illustrates the airflow through the slot 13 due to the ejector principle (FIG. 5A) and due to overpressure in the duct (FIG. 5B). The minor flow (FIG. 5C) will ensure laminar flow on the bottom surface of the wing (canard) and hereby reduce the drag. Pressure lost on the bottom surface is partly offset by increased airflow over the control surface with increased thrust and more air deflected downwards over the upper surface, increasing the lift. With a total power loss, air will flow upward through slot 13 to increase the effectiveness of the control surfaces. FIG. 3 shows the travel 26 of the control surfaces. The flaps (FIG. 3B) can be moved slightly up to form a reflex on the wing for high speed flight. In the full down position, the airflow from the slot 11 will follow the upper surface of the flaps to give reverse thrust. This can be used as speed brakes in flight or to reduce ground run on landings. The control surface on the canard (FIG. 3A) has over 180 degrees travel. It is used as elevator control. The 90 degree down position gives most lift, but further movement of the surface downwards will not seriously affect the lift, but will give reverse thrust for reducing speed of flight in combination with reverse on the flaps. FIG. 3C shows the travel of the ailerons and 24 illustrates travel with the flaps up, and 25 illustrates travel with full flaps. To secure longitudinal stability under these extreme control surface actions, it is possible to balance the airflow between the wing and the canard with the control plate 14 in the duct 9 in FIG. 4 and similar control plates in wing ducts 7. A separate control lever (or a control wheel) will be linked to the control plates. By moving the control lever forward, the airflow will be restricted to the canard. In the centre position air ducts are fully open both to the canard and the wing. Moving the lever aft will restrict the airflow to the wing. Alternatively, the control plates could be connected to the longitudinal elevator trim such that the last movement of the trim forward would restrict the airflow to the canard while the last movement of the trim aft would restrict airflow to the wing. Full forward movement of the control stick will move the canard control surface to full up position, closing the slot 11. This is used after touch down in combination with flaps full down to obtain maximum reverse thrust on landing run and to ensure that the aircraft's nose wheel is kept in contact with the ground. Ailerons are dropped down with the flaps, so that their downward travel is approx. half of the travel of the flaps. Maximum travel of aileron down would be approx. 90 degree for the upper surface, when the flaps are fully down and full aileron control is applied. With an aileron fully up, the opening of the slot 11 would be slightly reduced, reducing the airflow over the upgoing aileron and thus the thrust on that side of the aircraft. This will reduce the effect of adverse yaw, so that little or no differential action of ailerons is needed.

By keeping the engine(s) in the pressurized area from the blower(s), the blower(s) will act as supercharger for the engine(s) and increase its power. Also will the heat from the cooling air from the engine(s) prevent internal duct icing and increase the propulsive thrust. The pressurized air from the blower(s) can also be used for pressurization and ventilation of the cabin of the aircraft and to propel airflow through the exhaust stack of a piston engine to heat the cabin.

On smaller aircraft mirrors 21 (FIG. 1) can be installed on the bottom surface of the elevator close to the inboard end. These can be used to aid the pilot in reversing the aircraft on the ground in the parking area, making it possible to see aft of the aircraft on both sides when the control stick is fully forward.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. Aircraft (1) with at least one engine (6) and at least one blower (5), air intakes (2) for the blower and at least one plane (18) with at least one control surface device (12) having surfaces including a top surface (20) and airduct means (9,10) from the blower to the plane for producing jet flap propulsion in combination with the control surface device, characterized in
   a) that the plane (18) has a profile with thickness increasing to the rear of the plane;
   b) that the control surface device (12) is hinged with a hinge (17) just aft of the maximum thickness of the plane (18) and has an included trailing edge angle which is greater than 30 degrees and has a leading edge radius tangential to the surfaces of the control surface device;
   c) that the control surface device hinge (17) is positioned close to the mean line (19) of the plane (18); and
   d) that air holes (10) in the plane (18) for blowing the control surface device (12) are equipped with further means (15,16) for guiding the blown air to the top surface (20) of the control surface device (12).

2. Aircraft with at least one engine (6) and at least one blower (5), air intakes (2) for the blower and at least one plane (18) and a foreplane (22) each with at least one control surface device (12) to act as elevator on the foreplane and as ailerons and flaps on the main plane and having surfaces including top surfaces (20), and air-duct means (9,10) from the blower to the planes for producing jet flap propulsion in combination with the control surface device, characterized in a) that the plane (18) and the foreplane (22) have a profile with thickness increasing to the rear of the plane;

b) that the control surface device (12) is hinged with a hinge (17) just aft of the maximum thickness of the plane (18) and the foreplane (22) and has a trailing edge included angle which is greater than 30 degrees and has a leading edge radius tangential to the surfaces of the control surface device;

c) that the control surface device hinge (17) is positioned close to the mean line (19) of the plane (18) and the foreplane (22); and d) that air holes (10) in the plane (18) for blowing the control surface device (12) are equipped with further means (15,16) for guiding the blown air to the top surface (20) of the control surface device (12).

3. Aircraft according to claim 1, characterized in that the further means (15,16) comprise an extension (15) of the plane's (18) top surface and a sealing surface (16) positioned between the control surface device (12) and the plane (18).

4. Aircraft according to claim 1, characterized in that the air duct means (7,8,9) comprises means (14) for controlling the airflow in the ducts.

5. Aircraft according to claim 1, characterized in that the control surface device (12) is arranged to be rotated more than 180 degrees by means of the hinge (17).

6. Aircraft according to claim 4, characterized in that the controlling means (14) are coupled to at least one control device operated by the pilot.

7. Aircraft according to claim 6, characterized in that the control device is arranged to distribute the airflow from the blower to the canards, to the wings or both.

8. Aircraft according to claim 6, characterized in that the controlling means or the control device is connected to other regulation systems or devices in the aircraft.

9. Aircraft according to claim 8, characterized in that the controlling means or the control device is connected to the longitudinal elevator trim system.

* * * * *